US012594801B2

(12) United States Patent 
Schultz et al.

(10) Patent No.: US 12,594,801 B2 
(45) Date of Patent: Apr. 7, 2026

(54) AXLE SUSPENSION SYSTEM

(71) Applicant: Lippert Components, Inc., Elkhart, IN (US)

(72) Inventors: Timothy D. Schultz, Cassopolis, MI (US); John Shotwell, Edwardsburg, MI (US)

(73) Assignee: LIPPERT COMPONENTS, INC., Elkhart, IN (US)

( * ) Notice: Subject to any disclaimer, the term of this patent is extended or adjusted under 35 U.S.C. 154(b) by 0 days.

(21) Appl. No.: 18/893,155

(22) Filed: Sep. 23, 2024

(65) Prior Publication Data

US 2025/0100337 A1 Mar. 27, 2025

Related U.S. Application Data

(60) Provisional application No. 63/584,530, filed on Sep. 22, 2023.

(51) Int. Cl. 
*B60G 9/00* (2006.01)

(52) U.S. Cl. 
CPC .......... *B60G 9/003* (2013.01); *B60G 2202/12* (2013.01); *B60G 2204/1482* (2013.01); *B60G 2204/4302* (2013.01); *B60G 2300/04* (2013.01)

(58) Field of Classification Search 
CPC ................ B60G 9/003; B60G 2202/12; B60G 2204/1482; B60G 2204/4302; B60G 2300/04; B60G 2200/342

See application file for complete search history.

(56) References Cited

U.S. PATENT DOCUMENTS 2,182,249 A * 12/1939 Chayne .................. B60G 9/003 
267/221 
2,280,347 A 4/1942 Maurice 
(Continued)

FOREIGN PATENT DOCUMENTS

EP 0332037 A2 9/1989 
EP 0352541 B1 3/1993 
(Continued)

OTHER PUBLICATIONS https://www.quadratec.com/c/reference/what-track-bar-and-why-do-i-need-it, website pages, printed out Sep. 23, 2024, origination date unknown, 9 pp. 
(Continued)

*Primary Examiner* — Paul N Dickson 
*Assistant Examiner* — Matthew Joseph Ganci 
(74) *Attorney, Agent, or Firm* — NIXON & VANDERHYE P.C.

(57) ABSTRACT

An axle suspension system is suited for a trailer including a trailer frame, an axle, and left and right wheels respectively connected on opposite ends of the axle. The axle suspension system includes a swing arm pivotably securable at one end to the trailer frame and connectable at an opposite end to the axle via a connector. The connector includes a bottom surface connected to the swing arm. A spring is connected at one end to the swing arm and is connectable at an opposite end to the trailer frame. A resilient pad may be secured between the bottom surface of the connector and the swing arm. In some arrangements, a track bar may be securable at one end to the axle and may be secured at an opposite end to the swing arm.

7 Claims, 8 Drawing Sheets

(56) References Cited

U.S. PATENT DOCUMENTS

| | | | | |
|---|---|---|---|---|
| 3,254,902 | A | 6/1966 | Vittone | |
| 3,332,702 | A * | 7/1967 | Rosenkrands | B60G 21/055 |
| | | | | 267/248 |
| 5,328,159 | A | 7/1994 | Kaufman | |
| 5,758,898 | A * | 6/1998 | Gordon | B60G 9/022 |
| | | | | 280/124.111 |
| 7,300,064 | B2 | 11/2007 | Johnson | |
| 7,540,514 | B2 | 6/2009 | Westnedge | |
| 7,588,260 | B2 | 9/2009 | Lopez | |
| 7,648,149 | B2 | 1/2010 | Ryberg | |
| 7,726,674 | B2 | 6/2010 | Vandenberg | |
| 7,841,607 | B2 * | 11/2010 | Dodd | B60G 11/46 |
| | | | | 280/124.17 |
| 8,047,558 | B2 | 11/2011 | Ramsey | |
| 8,733,771 | B2 | 5/2014 | Johnson | |
| 8,783,701 | B1 | 7/2014 | Blevins | |
| 8,820,760 | B2 * | 9/2014 | Aalderink | B60G 9/003 |
| | | | | 301/124.1 |
| 8,833,779 | B1 | 9/2014 | Vestrand | |
| 10,792,971 | B2 | 10/2020 | Grimes | |
| 2023/0018844 | A1 | 1/2023 | Henry | |

FOREIGN PATENT DOCUMENTS

| | | |
|---|---|---|
| EP | 0431673 B1 | 7/1993 |
| GB | 2222391 A | 3/1990 |

OTHER PUBLICATIONS https://supersteerparts.com/what-is-a-track-bar, website pages, printed out Sep. 23, 2024, origination date unknown, 7 pp.

Timbren Trailer Suspension Enhancement System for Underslung Axles—5,000 lbs Timbren Trailer Leaf Spring Suspension T92MR (etrailer.com), website pages, printed out Sep. 23, 2024, origination date unknown, 10 pp.

Timbren Silent Ride Suspension for Single Axle Trailers w/ 2-3/8" Round Axles—2,000 lbs Timbren Trailer Leaf Spring Suspension TSR2000S03, website pages, printed out Sep. 23, 2024, origination date unknown, 14 pp.

* cited by examiner

AXLE SUSPENSION SYSTEM

CROSS-REFERENCES TO RELATED APPLICATIONS

This application claims the benefit of U.S. Provisional Patent Application No. 63/584,530, filed Sep. 22, 2023, the entire content of which is herein incorporated by reference.

STATEMENT REGARDING FEDERALLY SPONSORED RESEARCH OR DEVELOPMENT (Not Applicable)

BACKGROUND

The invention relates to a trailer axle suspension system and, more particularly, to an axle suspension system that allows a parallel face of an axle mounting bracket a slight tolerance to be non-parallel with the swing arm during use and/or incorporating a track bar that limits side-to-side movement.

A typical suspension system incorporates a swing arm that is pivotably secured at one end to the trailer frame and connected at an opposite end to the axle. A spring is connected at one end to the swing arm and is connected at an opposite end to the trailer frame. Such a suspension system serves to absorb road surface irregularities, providing a smoother ride for the trailer.

In many instances, one swing arm may be loaded via an irregularity in the road or the like while the other is not, causing the axle bracket or swing arm to twist in use, which could result in premature wear and/or failure.

Lateral loading on axles is also an existing problem for trailers of all types. Existing track bars are typically connected between the axle and the trailer frame. Existing designs, however, cause the axle to shift laterally relative to the trailer frame when the suspension is compressed due to the change in the relative geometry between the track bar, trailing arm, and trailer frame.

SUMMARY

The axle suspension system of the described embodiments, in one aspect, incorporates a flexible pad or the like between the axle and the swing arm to allow the axle to articulate when only one arm is loaded. The pad is resilient to allow the bracket on the beam to be non-parallel with the swing arm when needed. The pad is configured with enough give to allow the mounting bracket to move slightly out of alignment without breaking but also limits the movement to return to start without being overly resilient.

The suspension system of the described embodiments, according to another aspect, utilizes a track bar connected between the axle beam and the swing arm of the opposing side of the trailer frame. More specifically, the track bar may be connected to the swing arm close to the trailer connecting bracket of the swing arm, and the track bar is connected at its opposite end to the axle near its connection point to the swing arm. The track bar connections may be pivotable. The assembly creates a 3-bar linkage that ties the full system together to limit side-to-side movement but still allows pivoting of the bar for some shock absorption of movement and return to center.

In an exemplary embodiment, an axle suspension system for a trailer including a trailer frame, an axle, and left and right wheels respectively connected on opposite ends of the axle includes a swing arm pivotably securable at one end to the trailer frame and connectable at an opposite end to the axle via a connector. The connector includes a bottom surface connected to the swing arm. A spring connected at one end to the swing arm is connectable at an opposite end to the trailer frame, and a resilient pad is secured between the bottom surface of the connector and the swing arm.

The connector may include a connector bracket with the bottom surface and upwardly extending arms, where the upwardly extending arms are shaped to engage the axle. The connector may include a U-bolt top securable over the axle and engaging the connector bracket. The U-bolt top may extend through the resilient pad and into the swing arm.

The resilient pad may be configured to permit the connector to deflect to a position that is non-parallel with the swing arm. The resilient pad may have a Shore A hardness between 90-95 A.

The axle suspension system may include two of the swing arms including a left side swing arm that is connectable to the axle via a first one of the connectors and positionable on a side of the axle closer to the left wheel, and a right side swing arm connectable to the axle via a second one of the connectors and positionable on a side of the axle closer to the right wheel. Two of the springs may include a left side spring connected at one end to the left side spring arm and a right side spring connected at one end to the right side spring arm, and two of the resilient pads may be respectively secured between the first one of the connectors and the left side swing arm and between the second one of the connectors and the right side swing arm.

The axle suspension system may further include a track bar securable at one end to the axle and secured at an opposite end to the swing arm. The track bar may be pivotably securable at the one end to the axle and pivotably secured at the opposite end to the swing arm. The axle suspension system may still further include a track bar bracket welded to the swing arm adjacent the trailer frame, where the track bar is pivotably secured to the track bar bracket.

In another exemplary embodiment, an axle suspension system for a trailer including a trailer frame, an axle, and left and right wheels respectively connected on opposite ends of the axle includes a swing arm pivotably securable at one end to the trailer frame and connectable at an opposite end to the axle, a spring connected at one end to the swing arm and connectable at an opposite end to the trailer frame, and a track bar securable at one end to the axle and secured at an opposite end to the swing arm.

In yet another exemplary embodiment, a trailer includes a trailer frame, an axle, left and right wheels respectively connected on opposite ends of the axle, and the axle suspension system of the described embodiments for each of the left and right wheels.

BRIEF DESCRIPTION OF THE DRAWINGS

These and other aspects and advantages will be described in detail with reference to the accompanying drawings, in which.

DETAILED DESCRIPTION

Figure 1:
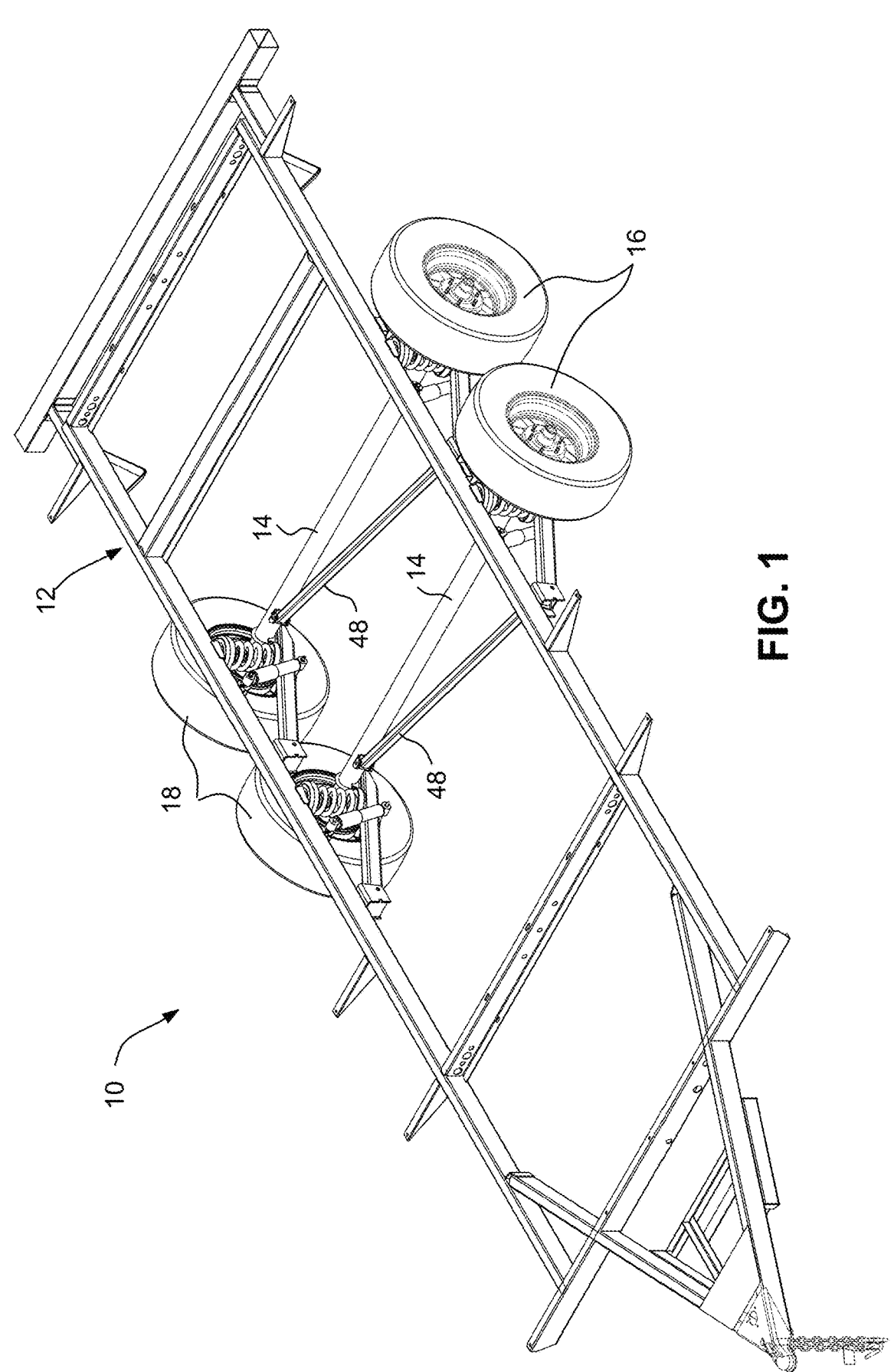
FIG. 1 is a perspective view of an exemplary tandem axle trailer including the axle suspension system of the described embodiments.

FIG. 1 shows an exemplary trailer 10 incorporating the axle suspension system of the described embodiments. The trailer 10 includes a trailer frame 12, at least one axle 14 and left and right wheels 16, 18 respectively connected on opposite ends of the axle 14. In the exemplary embodiment shown in FIG. 1, the vehicle or trailer is a tandem axle vehicle including two axles 14 and two corresponding sets of left and right wheels 16, 18. In a preferred construction, each of the wheels 16, 18 includes an associated axle suspension system 20. In some embodiments, the axle suspension system as described may be used on a single axle trailer or a trailer with three or more axles.

Figure 3:
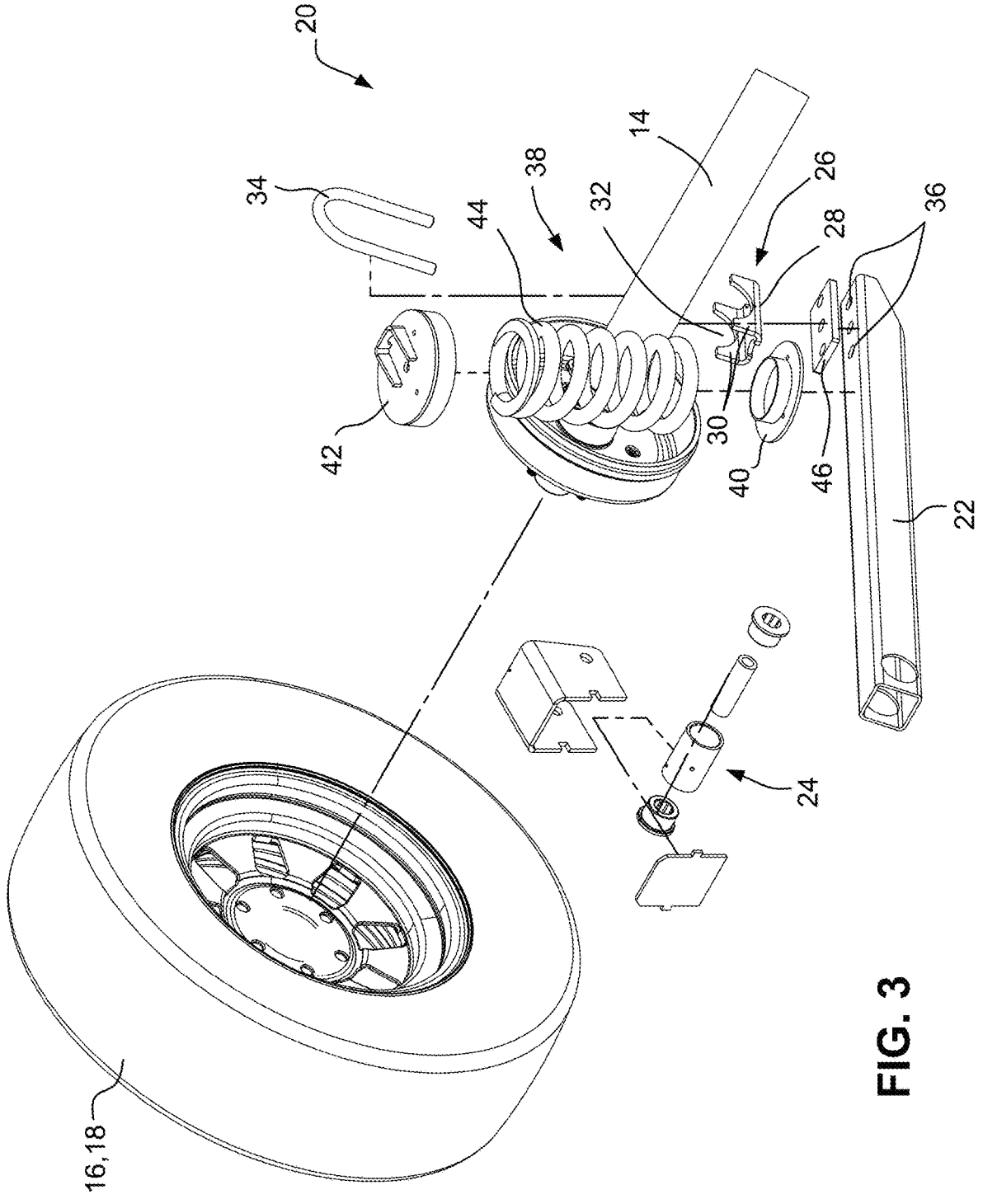
FIGS. 3 and 4 show details of the axle suspension system.
Figure 4:
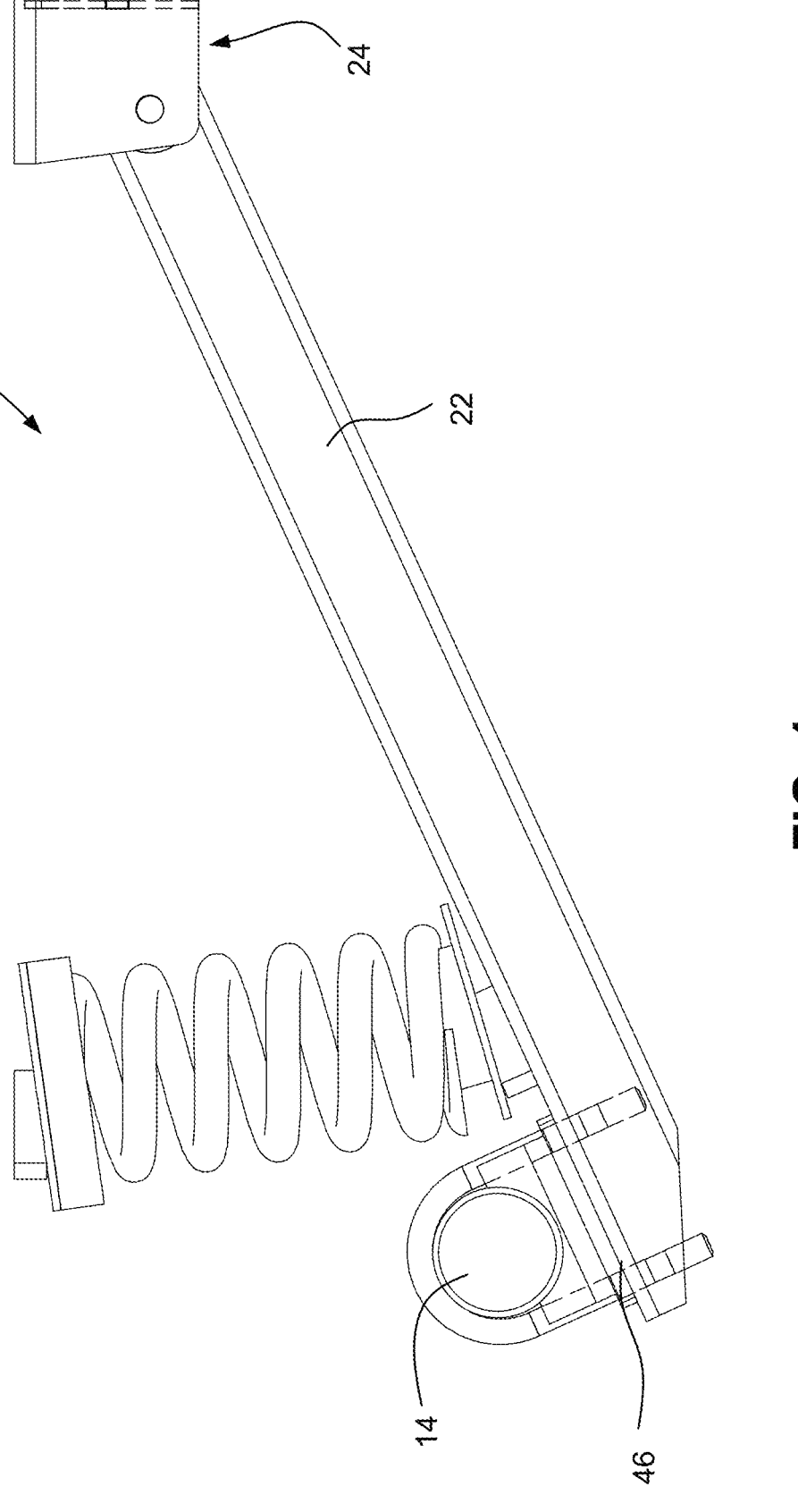

FIGS. 3 and 4 show details of an exemplary axle suspension system 20 according to the described embodiments. The axle suspension system 20 includes a swing arm 22 securable pivotably via a pivot assembly 24 at one end to the trailer frame 12. The swing arm 22 is connectable at an opposite end to the axle 14 via a connector 26.

The connector 26 includes a connector bracket with a bottom surface 28 and upwardly extending arms 30 incorporating axle-shaped cutouts 32 that are sized to engage the axle 14. The connector 26 is generally welded to the axle 14. The bottom surface 28 is connected to the swing arm 22. The connector 26 also includes a U-bolt top 34 that is securable over the axle 14, through the connector 26 and into the swing arm 22. The swing arm 22 may be provided with openings 36 for receiving the U-bolt top 34.

A spring assembly 38 is secured between the swing arm 22 and the trailer frame 12. The spring assembly 38 includes a lower spring mount 40 fixed to the swing arm 22 and an upper spring mount 42 fixed to the trailer frame 12. A spring 44 is positioned between the lower and upper spring mounts 40, 42.

In some embodiments, a resilient pad 46 is secured between the bottom surface 28 of the connector 26 and the swing arm 22. The resilient pad 46 is thus positioned between the axle 14 and the swing arm 22. The pad 46 allows the axle 14 to articulate when a swing arm 22 on one side of the trailer is loaded while the swing arm on the other side of the trailer is not. The connector 26 pinches the axle 14 against the resilient pad 46, but the resiliency of the pad 46 has some compliance that allows the bottom surface 28 of the connector 26 to be non-parallel with the swing arm 22 when needed. The resilient pad 46 does not necessarily act to reduce wear/rubbing between metal parts or act as shock absorption, but primarily serves to permit the connector 26 a slight tolerance to move and be momentarily non-parallel with the swing arm 22. The resilient pad 46 is configured with enough resiliency to allow the connector 26 to move slightly out of alignment without breaking while also limiting the movement to return to start without being overly resilient. An exemplary material for the resilient pad 46 is polyurethane with a Shore A hardness in a range of 90-95 A.

In other embodiments, the connector 26 may be modified to be fixed or secured to one or more of the side faces and/or bottom face of the swing arm and interact with the U-bolt to compress the swing arm and axle together. This may also be used in an embodiment with a square axle. In these exemplary embodiments, a resilient pad 46 may still be secured between the axle and swing arm. The resilient pad 46 may be particularly shaped to abut the top face of the swing arm and also cradle or accommodate the bottom of the axle. The resilient pad creates a tolerance between the swing arm and axle while in motion or in use.

Figure 2:
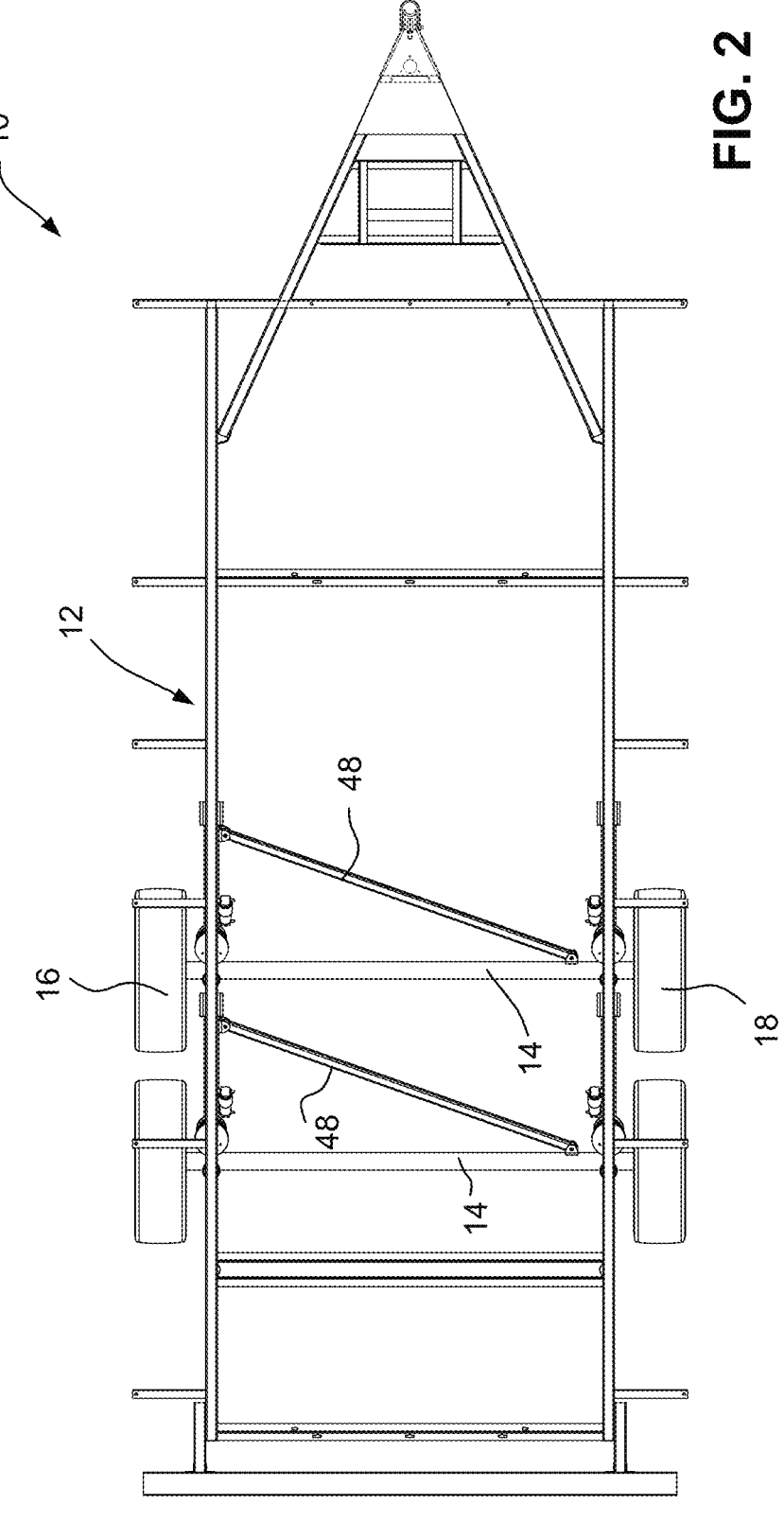
FIG. 2 is a plan view of the trailer.
Figure 5:
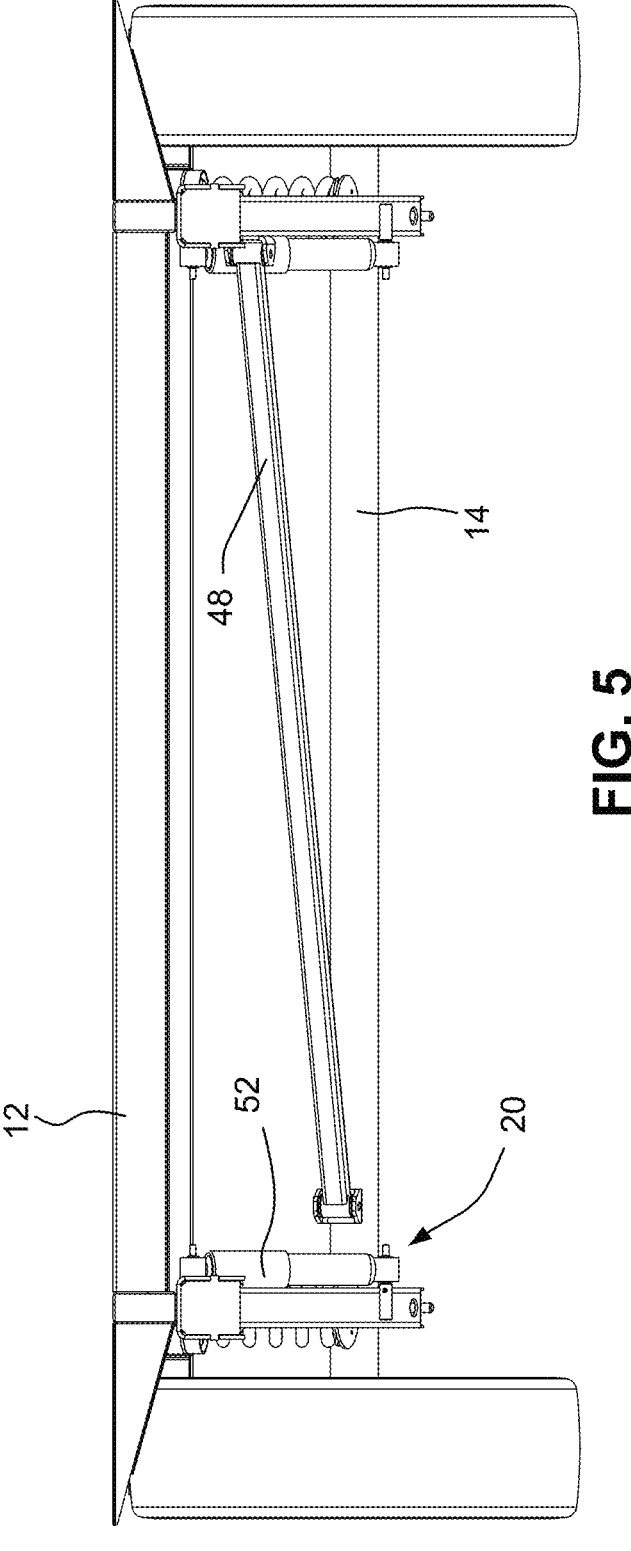
FIG. 5 is a rear view showing the axle and track bar.
Figures 6, 6A:
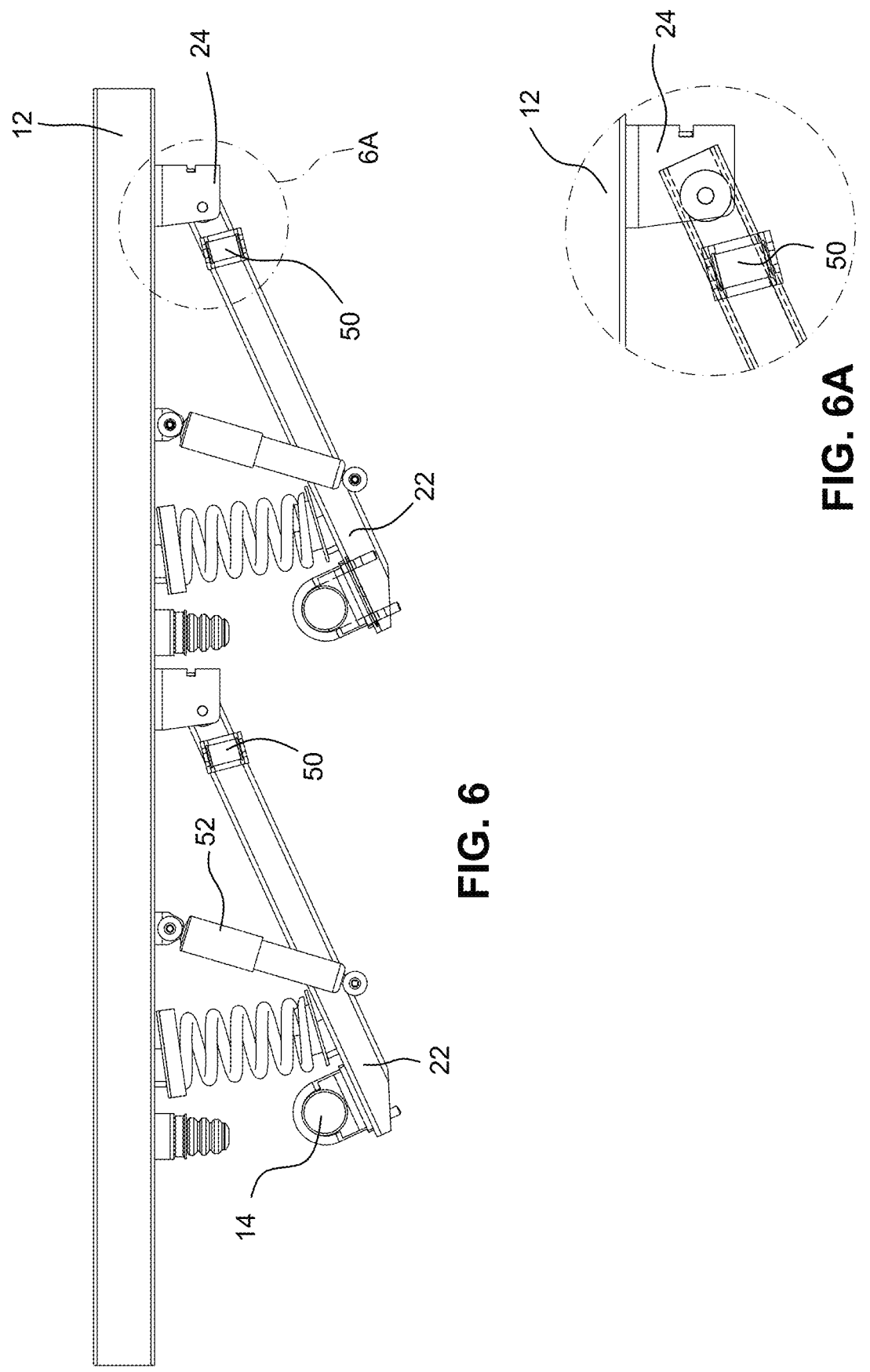
FIGS. 6 and 6A are side views of the axle suspension system.

With continued reference to FIGS. 1 and 2 and with reference to FIGS. 5 and 6, the axle suspension system 20 may alternatively or additionally include a track bar 48 secured at one end to the axle 14 and secured at an opposite end to the swing arm 22. The geometry of the track bar 48 connected between the axle 14 and the swing arm 22 stabilizes lateral movement of the trailer frame and suspension. In some embodiments, the track bar 48 is pivotably secured at the one end to the axle 14 and pivotably secured at the opposite end to the swing arm 22. With reference to FIGS. 6 and 6A, a track bar bracket 50 may be welded to the swing arm 22 adjacent the trailer frame 12. The track bar 48 is pivotably secured to the track bar bracket.

Figure 7A:
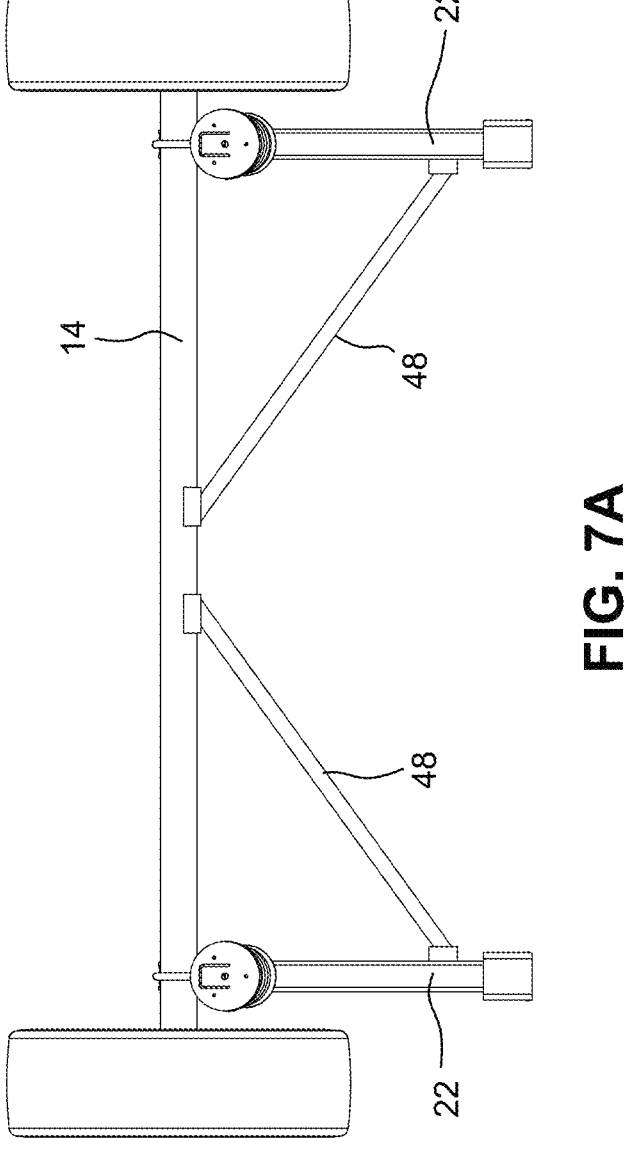
FIGS. 7A and 7B are perspective views of an alternate axle suspension system.
Figure 7B:
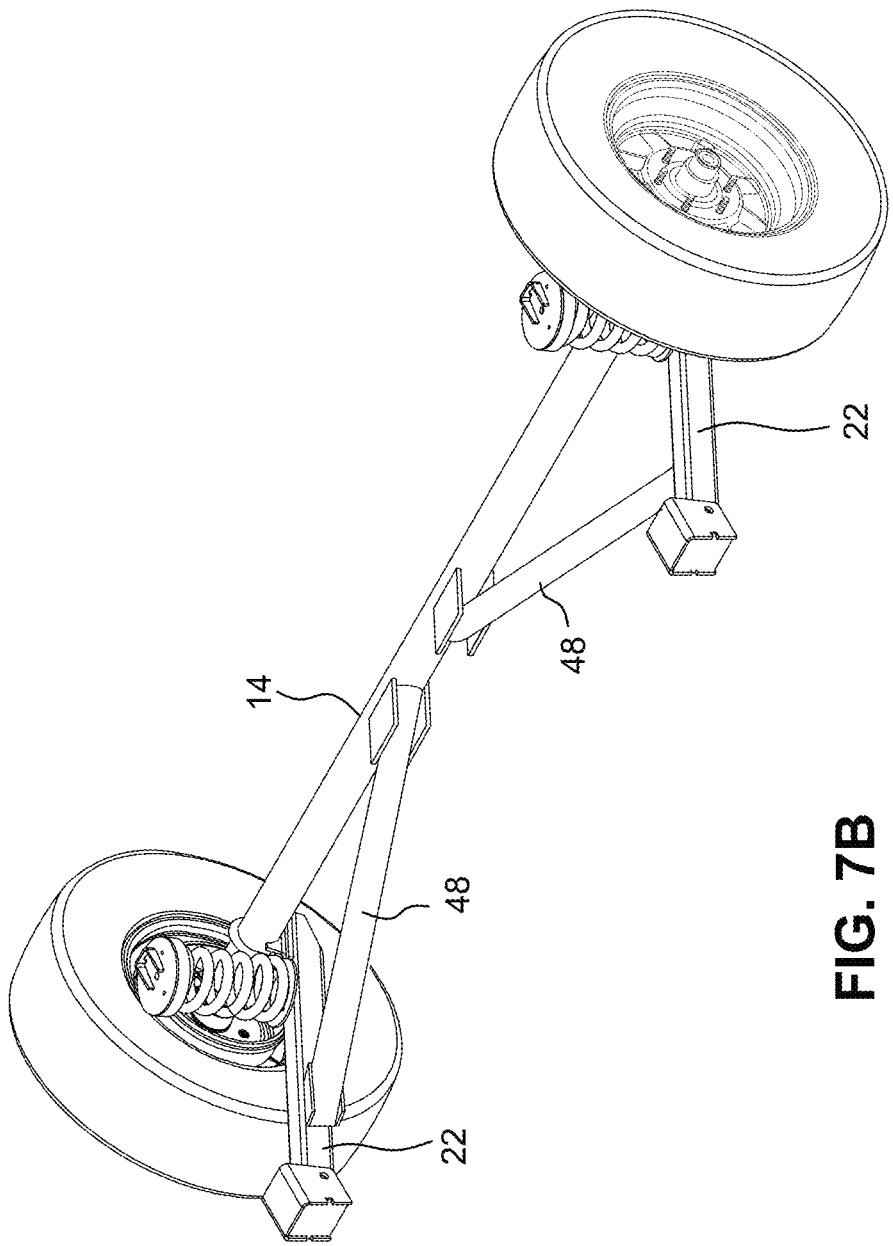

As shown in FIGS. 1, 2 and 5, the track bar 48 is pivotably connected to the swing arm 22 close to the trailer connecting bracket of the swing arm 22, and the track bar 48 is pivotably connected at its opposite and to the axle 14 near its connection point to the swing arm 22. The examples shown create a stabilizing 3-bar linkage system. The track bar 48 may be connected to any point of the axle intermediate to its two ends. As another example, the track bar 48 could be connected to the axle near its center point. In such an embodiment, a second track bar may be connected between the axle and the opposite swing arm to create a 4-bar linkage, as shown in FIGS. 7A and 7B.

In the variation shown in FIGS. 5 and 6, the axle suspension system 20 includes a shock 52 connected between the swing arm 22 and the trailer frame 12. The shock 52 supplements the dampening function of the spring assembly 38.

The resilient pad 46 and the track bar 48 may be usable together or independently. The resilient pad 46 allows the bracket on the beam to be non-parallel with the swing arm when needed and is configured with enough give to allow the mounting bracket to move slightly out of alignment without breaking but also limits the movement to return to start without being overly resilient. The track bar 48 creates a 3-bar linkage that ties the full system together to limit side-to-side movement but still allows pivoting of the bar for some shock absorption of movement and return to center. This structure eliminates the need for a leaf spring assembly and serves to reduce leaf spring or crossbeam failures.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An axle suspension system for a trailer including a trailer frame, an axle, and left and right wheels respectively connected on opposite ends of the axle, the axle suspension system comprising:

a swing arm pivotably securable at one end to the trailer frame and connectable at an opposite end to the axle;

a spring connected at one end to the swing arm and connectable at an opposite end to the trailer frame; and a track bar securable at one end to the axle and secured at an opposite end to the swing arm, wherein the track bar is pivotably securable at the one end to the axle on a first substantially vertical axis and pivotably secured at the opposite end to the swing arm on a second substantially vertical axis.

2. An axle suspension system according to claim 1, further comprising a track bar bracket welded to the swing arm adjacent the trailer frame, wherein the track bar is pivotably secured to the track bar bracket.

3. An axle suspension system according to claim 1, wherein the track bar is securable at the one end to the axle adjacent a distal end of the axle and is secured at the opposite end to the swing arm adjacent the trailer frame.

4. An axle suspension system according to claim 1, wherein the swing arm is connectable at the opposite end to the axle via a connector, wherein the connector includes a bottom surface connected to the swing arm, the axle suspension system further comprising a resilient pad secured between the bottom surface of the connector and the swing arm.

5. An axle suspension system according to claim 4, wherein the resilient pad is configured to permit the connector to deflect to a position that is non-parallel with the swing arm.

6. A trailer comprising:

a trailer frame;

an axle;

left and right wheels respectively connected on opposite ends of the axle; and an axle suspension system for each of the left and right wheels, each axle suspension system including:

a swing arm pivotably secured at one end to the trailer frame and connected at an opposite end to the axle via a connector, wherein the connector includes a bottom surface connected to the swing arm and an upper surface engageable with the axle, a spring connected at one end to the swing arm and connected at an opposite end to the trailer frame, and a resilient pad secured between the bottom surface of the connector and the swing arm; and a track bar secured at one end to the axle and secured at an opposite end to the swing arm, wherein the track bar is pivotably secured at the one end to the axle and pivotably secured at the opposite end to the swing arm.

7. A trailer according to claim 6, comprising a second axle and second left and right wheels connected on opposite ends of the second axle, the trailer further comprising a second axle suspension system for each of the second left and right wheels.

* * * * *